Dec. 17, 1929.  S. I. WEST ET AL  1,739,565
COW TAIL HOLDER
Filed March 1, 1928
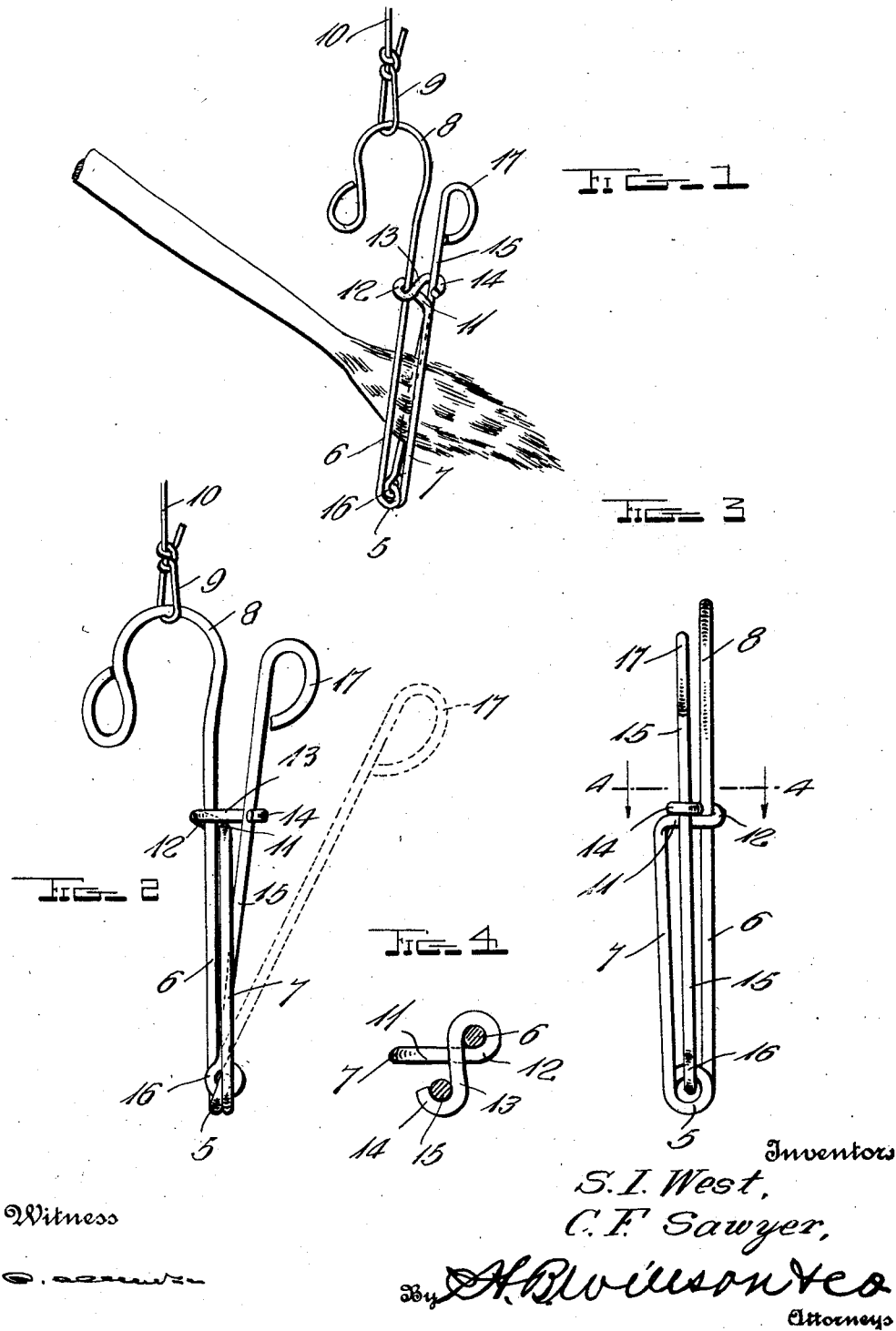
Inventors
S. I. West,
C. F. Sawyer,
By H. B. Willson & Co.
Attorneys
Witness Patented Dec. 17, 1929

1,739,565

UNITED STATES PATENT OFFICE

STEPHEN I. WEST AND CHARLIE F. SAWYER, OF PALOUSE, WASHINGTON

COW-TAIL HOLDER

Application filed March 1, 1928. Serial No. 258,318.

The invention aims to provide a new and improved device for so suspending a cow's tail as to prevent it from being soiled when the animal lies down in the stall, the device being also usable to prevent the cow from interfering with milking by lashing her tail in "fly time".

With the foregoing in view, the invention resides in the novel subject matter hereinafter described and claimed, description being accomplished by reference to the accompanying drawing.

Fig. 1 is a perspective view showing the manner of using the device.

Fig. 2 is a side elevation.

Fig. 3 is an edge elevation.

Fig. 4 is a horizontal sectional view on line 4—4 of Fig. 3.

In the drawing above briefly described, the preferred form of construction has been illustrated, and while such construction will be herein specifically explained, it is to be understood that within the scope of the invention as claimed, variations may be made.

In constructing the device, I take a length of rather stiff wire and bend it between its ends to form a coil 5 and a relatively long reach 6 and a comparatively short reach 7 extending upwardly from said coil in spaced, substantially parallel relation. The upper end of the reach 6 is bent laterally and downwardly to provide a suspending hook 8 which may be engaged with any desired suspending device. Preferably this hook is passed through a loop 9 on the end of a cord, chain or the like 10 suspended from the stable ceiling. The upper end portion of the reach 7 is extended horizontally as at 11 toward the reach 6, around which it is bent as at 12. From the bend or coil 12, the wire extends laterally substantially at right angles to the extended portion 11, as shown at 13, and terminates in a hook 14.

A second length 15 of rather stiff wire, has its lower end bent to provide a coil 16 which is inter-engaged with the coil 5 to pivotally mount said length 15. This length of wire is sufficiently long to extend above the hook 14 and its upper end is bent downwardly and inwardly to provide handle 17 by means of which it may be engaged with and disengaged from said hook.

The lower portions of the reaches 6—7 connected by the portions 5—11, constitute a frame for disposition at one side of the hairy terminal of the cow's tail, the upper end of this frame being provided with the suspending hook 8 and the lateral hook 14. The wire 15 constitutes a clamping bar for disposition at the opposite side of the tail terminal and when this clamping bar is swung upwardly and engaged with the hook 14, the tail is tightly held. Thus, when hook 8 is engaged with the loop 9 or with other supporting or suspended means, the cow's tail may be so supported that it cannot become soiled when the cow lies down. Moreover, in "fly time", the device may be used for holding the cow's tail against "switching," it being then preferably passed rearwardly between her legs before connection with the tail.

We claim:

1. A cow tail holder comprising a pair of substantialy parallel bars connected at both ends of one bar and providing a frame for dispostion at one side of the tail, a lateral hook and a suspending hook both rigid with one end of said frame, and a third bar pivoted at one end to the other end of said frame, the free end of said third bar being engageable with said lateral hook.

2. A cow tail holder comprising a length of wire bent between its ends to form a coil, a relatively long and a comparatively short reach extending upwardly from said coil and spaced apart, the upper end of said long reach being bent to form a suspending hook; the upper end of said short reach being extended laterally, curved around said long reach below said hook, bent laterally at substantially right angles to the first named laterally extended portion and finally bent to provide a second hook; and a second length of wire pivoted at its lower end to said coil, the upper portion of said second length of wire being engageable with said second hook.

In testimony whereof we have hereunto affixed our signatures.

STEPHEN I. WEST.
CHARLES F. SAWYER.